United States Patent
Ishii et al.

(10) Patent No.: US 7,704,593 B2
(45) Date of Patent: Apr. 27, 2010

(54) CUTTING TOOL AND METHOD OF PRODUCING THE SAME

(75) Inventors: Kazuhiro Ishii, Osaka (JP); Osamu Kanda, Takarazuka (JP); Takashi Fujii, Kairan (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 12/232,924

(22) Filed: Sep. 26, 2008

(65) Prior Publication Data

US 2009/0098372 A1  Apr. 16, 2009

Related U.S. Application Data

(63) Continuation of application No. PCT/JP2007/056185, filed on Mar. 26, 2007.

(30) Foreign Application Priority Data

Mar. 28, 2006 (JP) .............................. 2006-086773
Mar. 31, 2006 (JP) .............................. 2006-097318

(51) Int. Cl.
*B32B 9/00* (2006.01)
*C23C 16/00* (2006.01)

(52) U.S. Cl. .......................... 428/216; 51/307; 51/309; 428/336; 428/697; 428/698; 428/699

(58) Field of Classification Search .................. 51/307, 51/309; 428/216, 336, 697, 698, 699; 407/117, 407/119
See application file for complete search history.

(56) References Cited

U.S. PATENT DOCUMENTS

| | | | | |
|---|---|---|---|---|
| 5,722,803 A * | 3/1998 | Battaglia et al. | ............ | 407/119 |
| 5,879,823 A * | 3/1999 | Prizzi et al. | ................. | 428/698 |
| 6,277,486 B1 * | 8/2001 | Matsubara | ................... | 428/336 |
| 6,733,874 B2 * | 5/2004 | Ueda et al. | ................... | 428/699 |
| 7,169,485 B2 * | 1/2007 | Kohara et al. | ............... | 428/697 |
| 7,431,977 B2 * | 10/2008 | Hessman | .................... | 428/216 |
| 2005/0276990 A1* | 12/2005 | Kohara et al. | ............... | 428/698 |

FOREIGN PATENT DOCUMENTS

| | | |
|---|---|---|
| CN | 1620349 A | 5/2005 |
| JP | 3-146677 | 6/1991 |
| JP | 9-192906 | 7/1997 |
| JP | 10-287491 | 10/1998 |
| JP | 2000-326107 | * 11/2000 |
| JP | 2001-031949 | 2/2001 |

(Continued)

*Primary Examiner*—Archene Turner
(74) *Attorney, Agent, or Firm*—Clark & Brody

(57) ABSTRACT

A cutting tool having coating layers which are formed on the cutting tool substrate made of hard material, and the coating layers are composed of an inner layer of AlTiN, an interlayer of TiN, and an outer layer of $Al_2O_3$. The cutting tool is preferably produced by subjecting its substrate to surface-cleaning and surface treating by projection of flexible abrasives before forming the coating layers. The total thickness of the coating layer on a flank of the cutting tool is preferably in the range of 2 to 80 μm, and, further, it is preferable that thicknesses of the inner layer, the interlayer, and the outer layer on the flank are 0.5 to 35 μm, 1.0 to 40 μm, and 0.5 to 5 μm, respectively.

11 Claims, 1 Drawing Sheet

FOREIGN PATENT DOCUMENTS

| | | |
|---|---|---|
| JP | 2003-311505 | 11/2003 |
| JP | 2004-124246 | 4/2004 |
| JP | 2004-188500 | 7/2004 |
| JP | 2004-188502 | 7/2004 |
| JP | 2004-188575 | 7/2004 |
| JP | 2004-351540 | 12/2004 |
| JP | 2005-138209 | 6/2005 |
| JP | 2005-271153 | 10/2005 |

* cited by examiner (a)

(b)

CUTTING TOOL AND METHOD OF PRODUCING THE SAME

This application is a continuation of International Patent Application No. PCT/JP2007/056185 filed Mar. 26, 2007. This PCT application was not in English as published under PCT Article 21(2).

The disclosure of International Application No. PCT/JP2007/56185 filed Mar. 26, 2007 including specification, drawings and claims is incorporated herein by reference in its entirety.

TECHNICAL FIELD

The present invention relates to a cutting tool and a method of producing the cutting tool, and in particular, to a cutting tool used suitably for high speed cutting of steel materials with high hardness.

BACKGROUND ART

In high speed cutting of steel materials with high hardness, the temperature of the interface between the blade surface of a cutting tool and a work piece rises up to about 1000° C., and there is a case in which components of the work piece are burned onto the cutting tool and thus coagulation occurs. When coagulation of components of a work piece occurs, the blade surface of the cutting tool is damaged to the severe detriment of the cutting function thereof.

As a cutting tool subject to such severe thermal history, conventionally, there has been used one which is made of a hard alloy such as tungsten carbide or cermet such as titanium carbonitride as a substrate and is coated on the surface.

For example, patent document 1 proposes a surface-coated cermet cutting tool that has a hard covering layer having an excellent thermal shock resistance, which is formed on the surface of a tool base of a tungsten carbide-base hard alloy or titanium carbonitride-base cermet, and the hard covering layer is composed of the following (a) to (c):

(a) an inner layer that is composed of a Ti compound layer consisted of one layer or two or more multilayer selected from carbide layer, nitride layer, carbonitride layer, carbonate layer, and carbonitride oxide layer of Ti formed by vapor deposition, and that has an average layer thickness in the range of 3 to 20 µm;

(b) an interlayer that is composed of an aluminum oxide layer having α type crystal structure, the layer has a structure dispersed cracks generated by a heat transformation, and the aluminum oxide is produced by subjecting aluminum oxide having a κ type or θ type crystal structure to the heat transformation treatment in a state of being formed by vapor deposition in order to convert the crystal structure into an α type crystal structure, and that has an average layer thickness in the range of 3 to 15 µm; and (c) a surface layer that is composed of an aluminum oxide layer having a κ type crystal structure in a state being formed by vapor deposition and that has an average layer thickness in the range of 0.5 to 2 µm.

Patent document 2 proposes a surface-coated cermet cutting tool that has a hard covering layer having an excellent thermal shock resistance, which is formed on the surface of a tool base of a tungsten carbide-base hard alloy or titanium carbonitride-base cermet, and the hard covering layer is composed of the following (a) and (b):

(a) an inner layer that is composed of a Ti compound layer consisted of one layer or two or more multilayer selected from carbide layer, nitride layer, carbonitride layer, carbonate layer, and carbonitride oxide layer of Ti formed by vapor deposition, and that has an average layer thickness in the range of 3 to 20 µm; and (b) an outer multiple layer having a under side layer and a upper side layer, the under side layer is composed of an aluminum oxide layer having α type crystal structure, the under side layer has a structure dispersed cracks generated by a heat transformation, and the aluminum oxide is produced by subjecting aluminum oxide having a κ type crystal structure to the heat transformation treatment in a state of being formed by vapor deposition in order to convert the crystal structure into an α type crystal structure, and that has an average layer thickness in the range of 3 to 15 µm, and the upper side layer that is composed of an aluminum oxide layer having a α type crystal structure in a state being formed by vapor deposition and that has an average layer thickness in the range of 0.5 to 2 µm.

Patent document 3 proposes a surface-coated cermet cutting tool that has a hard covering layer having an excellent thermal shock resistance, which is formed on the surface of a tool base of a tungsten carbide-base hard alloy or titanium carbonitride-base cermet, and the hard covering layer is composed of the following (a) and (b):

(a) an inner layer that is composed of a Ti compound layer consisted of one layer or two or more multilayer selected from carbide layer, nitride layer, carbonitride layer, carbonate layer, and carbonitride oxide layer of Ti formed by vapor deposition, and that has an average layer thickness in the range of 3 to 20 µm; and (b) an outer multiple layer having a under side layer and a upper side layer, the under side layer is composed of an aluminum oxide layer having α type crystal structure, the under side layer has a structure dispersed cracks generated by a heat treatment, and the aluminum oxide is produced by subjecting aluminum oxide having a κ type crystal structure to the heat treatment in a state of being formed by vapor deposition in order to convert the crystal structure into an α type crystal structure, and that has an average layer thickness in the range of 1 to 15 µm, and the upper side layer that is composed of an aluminum oxide layer having a α type crystal structure in a state being formed by vapor deposition and that has an average layer thickness in the range of 0.1 to 2 µm.

Patent document 4 proposes a surface-coated cermet cutting tool that has a hard covering layer having an excellent wear resistance, which is formed on the surface of a tool base of a tungsten carbide-base hard alloy or titanium carbonitride-base cermet, and the hard covering layer is composed of the following (a) and (b):

(a) an aluminum oxide layer having an average layer thickness in the range of 0.2 to 3 µm as an upper side layer;

(b) a compound nitride layer of Al and Ti having an average layer thickness in the range of 0.8 to 8 µm as a under side layer; and the under side layer is composed of:

a maximum Al content points and a minimum Al content points exist alternatively and repeatedly at predetermined intervals along the layer thickness direction of the under side layer;

the component concentration distribution structure is such that the content ratio of Al and that of Ti continuously change from the maximum Al point to the minimum Al point and from the minimum Al point to the maximum Al point;

the minimum Al point satisfies the composition formula $(Al_{1-X}Ti_X)N$ (where X represents 0.35 to 0.60 in atomic ratio) while the maximum Al point satisfies the composition formula $(Al_{1-Y}Ti_Y)N$ (where Y represents 0.05 to 0.30 in atomic ratio); and the interval between the adjacent said minimum Al point and maximum Al point is 0.01 to 0.1 μm.

Patent document 5 proposes a diamond-covered hard member whose substrate is covered by a coating of diamond and/or a diamond-like carbon, the surface average roughness of the substrate is adjusted in the range of 0.1 to 2.5 μm in Ra representation while the surface average roughness of the coating is adjusted not more than 1.5 μm in Ra representation, with Ra(c)≦Ra(s) where Ra(c) denotes the mean surface average roughness of the coating and Ra(s) denotes the mean surface average roughness of the substrate.

[Patent document 1] Publication of Japanese Patent Application 2004-188502

[Patent document 2] Publication of Japanese Patent Application 2004-188500

[Patent document 3] Publication of Japanese Patent Application 2004-188575

[Patent document 4] Publication of Japanese Patent Application 2004-351540

[Patent document 5] Publication of Japanese Patent Application Hei 10-287491

DISCLOSURE OF THE INVENTION

Problems to be Solved by the Invention

The surface-coated cermet cutting tools proposed by the above patent documents 1 to 3 are supposed to improve chipping resistance by providing coating layers having certain specific chemical compositions. Although heat resistance of these cutting tools is improved, the performance deteriorates as soon as the coating is flaked by mechanical factors such as impact in cutting. Further, the thickness of the coating layer is not specified on a portion basis, and there is a fear that the heat resistant effect becomes insufficient.

The surface-coated cermet cutting tool proposed by the above patent document 4 has an aluminum oxide layer for the outer surface, but the aluminum oxide has a large coefficient of linear thermal expansion, and has a crucial defect such that deteriorates the adhesion force at a film interface markedly in a high temperature region of 800° C. or more. In high speed cutting, when temperature of the film interface rises, sufficient adhesion force is not ensured, arising problems in which a wear resistance rapidly deteriorates and cutting performance cannot be maintained.

On the other hand, the surface-coated cermet cutting tools proposed by the above patent documents 1 to 4 are based on studies of the composition of the coating layer, and no document describes pretreatment of the substrate done before forming the coating layer. Further, in patent document 5, there are listed merits in which by adjusting the surface roughness, in producing coatings covering the surface of the substrate, nuclei of diamond can be easily and massively formed, the coating can be dense, and the quality of the coating is excellent. However, as described later, according to the studies of the present inventors, it has made clear that tool life of cutting tools used in high speed cutting of hard steel cannot be explained only by adjusting the surface roughness.

The present inventors have keenly studied to solve such problems and completed a cutting tool having coating layers which are excellent in heat shock resistance and flaking strength physically and chemically. The present inventors have also keenly studied on pretreatment applied to the cutting tool substrate (sintered metal) before forming coating layers and completed a cutting tool with a further improved tool life.

It is an object of the present invention to provide a cutting tool with an excellent tool life.

Means to Solve the Problems

The present invention is summarized by a cutting tool shown in (1) below and a production method of the cutting tool shown in (2) below.

(1) A cutting tool having coating layers which are formed on the cutting tool substrate made of hard material, and the coating layers are composed of an inner layer of AlTiN, an interlayer of TiN, and an outer layer of $Al_2O_3$.

In this way, by interposing an interlayer of TiN with high adhesion between an outer layer of $Al_2O_3$ and an inner layer of AlTiN, wear resistance and adhesion force of the outer layer of $Al_2O_3$ can be strengthened.

The cutting tool is preferably produced by subjecting its substrate to surface-cleaning and surface treating by projection of flexible abrasives before forming the coating layers. The total thickness of the coating layer on a flank of the cutting tool is preferably in the range of 2 to 80 μm, and, further, it is preferable that thicknesses of the inner layer, the interlayer, and the outer layer on the flank are 0.5 to 35 μm, 1.0 to 40 μm, and 0.5 to 5 μm, respectively. The total thickness of the coating layer on a face is preferably in the range of 2 to 40 μm, and, further, it is preferable that thicknesses of the inner layer, the interlayer, and the outer layer on the face are 1 to 20 μm, 1 to 20 μm, and 0.01 to 2 μm, respectively.

(2) A method for producing a cutting tool, wherein coating layers are formed on the surface of the cutting tool substrate made of hard material by a dry coating after subjecting surface-cleaning and surface-treating by projection of soft abrasives.

EFFECTS OF THE INVENTION

In the cutting tool of the present invention, Al in the inner layer dissociates during cutting and diffuses outwardly to form $Al_2O_3$ in the vicinity of the surface of the coating layer to compensate for the outer layer. Therefore, excellent heat resistance and wear resistance can be stably obtained, and the tool life is long. Further, according to the production method of a cutting tool of the present invention, the adhesion between the cutting tool substrate (sintered metal) and the coating layer can be improved, and so a cutting tool with a longer tool life can be provided.

BEST MODE FOR CARRYING OUT THE INVENTION

FIG. 1 is a schematic diagram showing an example of the cutting tool according to the present invention. As shown in FIG. 1, for example, a cutting tool 2 moves relatively in the left direction of FIG. 1(a) and cuts the surface of a work piece 1. The cutting tools include turning tools, rotating tools and drilling tools and so on. Additionally, in the following explanation, the term flank is a face mainly contacting the work piece in the cutting tool; for example, it is a face 3 in a lathe processing tool shown in FIG. 1(b). Further, the term face is a face for scooping chips of the work piece; for example, it is a face 4 in the lathe processing tool shown in FIG. 1(b).

1. Chemical Composition of the Cutting Tool Substrate and Coating Layers

In the cutting tool of the present invention, the coating layers composed of the following three layers is formed on a cutting tool substrate made of hard material.

The hard material constituting the cutting tool substrate is not particularly limited, but there are listed a hard alloy typified by WC—TiC-5% Co, etc., and cermet typified by TiC-20%TiN-15%WC-10%Mo$_2$C-5%Ni, etc. Among these, it is preferable to use a hard alloy from the viewpoints of thermal conductivity and relaxing of interface heat stress between the substrate and the coating layers in cutting.

The coating layer is composed of an inner layer of AlTiN, an interlayer of TiN, and an outer layer of Al$_2$O$_3$.

The AlTiN constituting the inner layer is excellent in heat resistance and wear resistance, with its performance stable up to 1000° C., and also excellent in adhesion with the cutting tool substrate. Further, Al in the inner layer dissociates due to a temperature increase during cutting, and diffuses outwardly to react with oxygen in air and thus form a protection film of Al$_2$O$_3$ in the surface layer (outer layer) of the coatings. Therefore, the inner layer was determined to be of AlTiN. While substantially made of AlTiN, the inner layer may slightly contain impurities.

TiN constituting the interlayer is as low as 700° C. in oxidation temperature, and so it is a material originally suitable for cutting at a slow or medium speed with relatively small heat generation. However, it is excellent in adhesion and an effective substance against mechanical flaking, and therefore used for the interlayer. While substantially made of TiN, the interlayer may slightly contain impurities.

Although Al$_2$O$_3$ constituting the outer layer is weak in mechanical flaking, it is excellent in heat resistance and wear resistance, with its performance stable up to 2000° C. Therefore, the outer layer was determined to be of Al$_2$O$_3$. While substantially made of Al$_2$O$_3$, the outer layer may slightly contain impurities.

As described above, in the coating layers on the cutting tool of the present invention, the outer layer is made of a material highest in heat resistance and wear resistance, the interlayer is made of a material most excellent in adhesion, and the inner layer is made of a material which is good in adhesion, heat resistance, and wear resistance, and from which Al dissociates and diffuses outwardly. Hence, even when the outer layer and the interlayer are flaked, the Al dissociating from the inner layer soon reacts with oxygen on the surface layer of the coating to compensate for the protection film of the outer layer, so that high heat resistance and wear resistance can stably be obtained.

2. Thickness of Coating Layers

2-1 Thickness of Coating Layers in Flank

In the cutting tool of the present invention, the total thickness of the coating layers on the flank is preferably in the range of 2 to 80 μm. Since the flank is a place of the heaviest load during cutting with intense generation of heat, it is preferable to make the thickness of the coating layer on the flank as thick as possible.

In particular, for the coating layers on the flank, the total thickness is preferably 2 μm or more. However, when the total thickness of the coating layers on the flank exceeds 80 μm, flaking tends to occur, and it becomes week against mechanical shocks. In addition the time required for film formation becomes long. The total thickness of the coating layers on the flank is therefore preferably in the range of 2 to 80 μm.

It is preferable that the thicknesses of the inner layer (AlTiN), the interlayer (TiN), and the outer layer (Al$_2$O$_3$) on the flank are 0.5 to 35 μm, 1.0 to 40 μm, and 0.5 to 5 μm, respectively.

When the thickness of the inner layer (AlTiN) on the flank is less than 0.5 μm, heat resistance might become insufficient. However, when the thickness of the inner layer (AlTiN) on the flank is more than 35 μm, flaking tends to occur, only resulting in an increase in time required for film formation. Hence, it is preferable that the thickness of the inner layer (AlTiN) on the flank is 0.5 to 35 μm.

When the thickness of the interlayer (TiN) on the flank is less than 1.0 μm, heat resistance might become insufficient. However, when the thickness of the interlayer (TiN) on the flank is more than 40 μm, flaking tends to occur, only resulting in an increase in time required for film formation. Hence, it is preferable that the thickness of the interlayer (TiN) on the flank is 1.0 to 40 μm.

The thickness of the outer layer (Al$_2$O$_3$) on the flank is preferably 0.5 μm or more for obtaining a sufficient heat resistance. However, when the thickness of the outer layer (Al$_2$O$_3$) on the flank in more than 5 μm, flaking tends to occur, only resulting in an increase in time required for film formation. Hence, it is preferable that the thickness of the outer layer (Al$_2$O$_3$) on the flank is 0.5 to 5 μm.

2-2 Thickness of Coating Layers in Face

In the cutting tool of the present invention, the total thickness of the coating layers on the face is preferably in the range of 2 to 40 μm. Although heat generation during cutting is small, the face is a place which contacts with chips, and so the surface roughness is preferably as small as possible. Hence, it is preferable that coating layers are as thin as possible.

In particular, the total thickness of the coating layers on the face is preferably 40 μm or less. However, when the total thickness of the coating layers on the face is less than 2 μm, wear occurs early in cutting, and so heat resistance might become insufficient. The total thickness of the coating layers on the face is therefore preferably in the range of 2 to 40 μm.

Thicknesses of the inner layer (AlTiN), the interlayer (TiN), and the outer layer (Al$_2$O$_3$) on the face are preferably 1 to 20 μm, 1 to 20 μm, and 0.01 to 2 μm, respectively.

When the thickness of the inner layer (AlTiN) on the face is less than 1 μm, heat resistance might become insufficient. However, when the thickness of the inner layer (AlTiN) on the face is more than 20 μm, not only flaking tends to occur, but also the time required for film formation increases. Hence, it is preferable that the thickness of the inner layer (AlTiN) on the face is in the range of 1 to 20 μm.

When the thickness of the interlayer (TiN) on the face is less than 1 μm, heat resistance and adhesion might become insufficient. However, when the thickness of the interlayer (TiN) on the face is more than 20 μm, not only flaking tends to occur, but also the time required for film formation increases. Hence, it is preferable that the thickness of the interlayer (TiN) on the face is in the range of 1 to 20 μm.

When the thickness of the outer layer (Al$_2$O$_3$) on the face is less than 0.01 μM, sufficient heat resistance and adhesion might become insufficient. However, when the thickness of the outer layer (Al$_2$O$_3$) on the face is more than 2 μm, not only flaking tends to occur, but also the time required for film formation increases. Hence, it is preferable that the thickness of the outer layer (Al$_2$O$_3$) on the face is 0.01 to 2 μm.

3. Method of Producing the Cutting Tool According to the Present Invention

3-1 Method of Producing the Cutting Tool Substrate

The method of producing a hard alloy or cermet as the cutting tool substrate is not particularly limited. For example, it can be produced by the steps: mixing metal powder and granulating the mixture; pressing it in a mold; punched out; and sintering the resulting molded compact in a vacuum.

3-2 Method of Producing the Coating Layers

The method of producing the coating layers is not particularly limited. For example, it can adopt physical vapor deposition (PVD) represented by sputtering, arc ion plating, and the like, or chemical vapor deposition (CVD) represented by thermal CVD and plasma CVD. Taking physical vapor deposition as an example, it is specifically explained.

For example, mixed powder of metal elements constituting the coating layer is pressed into disk geometry in a mold, and sintered in a vacuum, ending up as a target. The target components are excited in a gas phase electrically by physical vapor deposition (PVD) such as sputtering. Thereafter, the gas phase of an apparatus is filled with, for example, nitrogen gas, with which the gas-phase excited target components are allowed to bond chemically on the surface of the cutting tool substrate to be coated. As a result, coating components are deposited on the surface of the cutting tool substrate. By heat treating such cutting tool substrate, the deposited components become a chemically stable composition and adhere to the cutting tool substrate to be coated, resulting in the predetermined coating layer.

The inner layer (AlTiN) can be formed by the following method. For example, it can be formed in such manner that mixed powder of Al and Ti powder is pressed into a desired shape, and sintered in a vacuum, ending up as a target. A PVD apparatus is filled with nitrogen gas, with which the discharge excited metal components react. The interlayer (TiN) of the coating layer may be produced in such manner that using Ti powder in place of the above mixed powder, Ti and nitrogen are allowed to react with one another in a state where a PVD apparatus is filled with the nitrogen gas. Further, the outer layer ($Al_2O_3$) of the coating layer may be produced in such a manner that using Al powder, Al and oxygen are allowed to react with one another in a state where a PVD apparatus is filled with the oxygen gas.

In the case where the thicknesses of the flank and the face are adjusted to differ, the adjustment may be done by controlling the film coverage of the coated body by mechanically controlling the longitudinal direction/transversal direction positions of the coated body or by distorting the magnetic lines formed between the counter electrodes of the target/coated substrate with a nonequilibrium electric field.

3-3 Surface-Cleaning and Surface Treating by Projection of Flexible Abrasives

In the method of producing the cutting tool of the present invention, it is preferable that after subjecting to surface-cleaning and surface treating by projection of flexible abrasives (hereinafter called "Aerolap lapping") in advance, the coating layer is formed on the cutting tool substrate. Aerolap lapping is a method of cleaning and mirror finishing the surface of the substrate into the submicron order by projection with flexible abrasives at high speed.

The conventional lapping treatment involves sliding and rotating while sandwiching the upper and lower surfaces of a workpiece with plates. This treatment is in a wet process because water dispersion of alumina or glass fine powders of a submicron order in particle diameter as a polishing agent is poured into a sliding interface. Such lapping treatment is limited to lapping for a plane article, and so the lapping of a rounded part, an inclined part, and the like is difficult structurally. In view of this, the present inventors focused on Aerolap lapping, which is capable of lapping of the rounded part and the inclined part.

Then, as a result of studying the lapping treatment of the cutting tool substrate by Aerolap lapping, the present inventors have found that Aerolap lapping adjusts the surface roughness of the cutting tool substrate uniformly and can improve its adhesion with the coating layers, and further, can physically remove impurities off the surface of the cutting tool substrate that could not be completely removed by the conventional wet cleaning. That is, with Aerolap lapping, the adhesion between the cutting tool substrate and the coating layers that cannot be explained merely by surface roughness can be enhanced, thereby improving the tool life remarkably.

The flexible abrasives is a particulate polishing material in which an abrasive grain of micron meter diameter is used as a core material, and the core material is covered with a polymer type resin. As the abrasive grain, at least one of diamond, silicon carbide, and alumina may be used. The grain size of the abrasive grain is preferably in the range of 3000 to 10000 meshes. The polymer type resin is not particularly limited, and gelatin with desired elasticity and viscosity by containing water can be used. When gelatin is used, the diameter of the flexible abrasive is preferably in the range of 0.1 to 2 mm. A multi-liquid for the polymer type resin can contain a water-soluble oil as an evaporation preventing material. As the evaporation preventing material, for example, ethylene glycol, sorbitol, and the like can be used.

EXAMPLES

An experiment was carried out to confirm the effects of the coating layer of the present invention. In this experiment, first, after mixing and granulating metal powder, this mixture was pressure-molded in a mold, punched out, and the resulting molded compact was sintered in a vacuum at 1450° C. for 1.0 hour, thereby producing a cutting tool substrate.

The cutting tool of example 1 of the present invention was produced in the following manner. The cutting tool substrate was placed in a PVD apparatus, a mixed sintered body of Al and Ti was used as a target, nitrogen gas was filled therein, and each metal excited by discharge and nitrogen were allowed to react with one another to form a inner layer of AlTiN on the cutting tool substrate. Thereafter, in the PVD apparatus, the Ti target was excited by discharge under a nitrogen atmosphere to form an interlayer of TiN, and further, the Al target was excited by discharge under an oxygen atmosphere to form an outer layer of $Al_2O_3$.

Additionally, in this time, respective thicknesses of the flank and face of each layer were adjusted by distorting magnetic lines formed between the counter electrodes of target/coated substrate with a nonequilibrium electric field and by intentionally changing the film coverage of the coated body.

On the other hand, in a cutting tool of comparative example 1, likewise using the PVD apparatus, an inner layer of TiCN, an interlayer of $Al_2O_3$, and an outer layer of TiN were formed on the cutting tool substrate by adjusting the target and atmosphere gas.

The cutting tools thus obtained were analyzed for performance of surface roughness, coefficient of friction, and adhesion, and also their tool lives were compared after cutting an alloy (S13Cr) containing 5% nickel of 85 mm outer diameter and 500 mm length at a temperature of 800° C. or more and at a cutting speed of 70 m/min.

Additionally, surface roughness was measured as "arithmetic mean roughness Ra" as defined by JIS B 0601-1994 in such a manner that a length of 10 mm of an arbitrary film-coated surface was scanned using a sensing pin (pin made of diamond; outer diameter 25 μm).

The coefficient of friction was measured using a Bauden type sliding tester under sliding conditions of 5N in load, room temperature, 4 mm/s in speed, and steel ball made of SUS of 5 mm in diameter.

The adhesion was measured in such a manner that using a scratch type tester, scanning was conducted with a diamond sensing pin of 200 μm in outer diameter under a load in the range of 0 to 100 N, at a scanning speed of 10 mm/min and a load speed 100 N/min, and the load value at which an abnormal vibration signal was detected was defined as film breakage and assumed the adhesion force.

The term tool life means the number of work pieces that were able to be cut without any one of the situations shown in (1) to (3) below.

(1) Breakage of the cutting tool itself (break of blade edge, cracking, etc.)

(2) Flaking of the hard protection film (coating layer) of the surface of the cutting tool.

(3) Adhesion of components of a work piece onto the hard protection film

These performances are shown in Table 1.

[Table 1]

TABLE 1

| | | Coating layers | | | | | | Physical properties | | Cutting life |
| | | inner layer | | Interlayer | | Outer layer | | Surface roughness | Adhesion | (number |
| Classification | Base metal | Composition | Thickness (μm) | Composition | Thickness (μm) | Composition | Thickness (μm) | Ra (μm) | Coefficient of friction | force (N) | of pieces treated) |
|---|---|---|---|---|---|---|---|---|---|---|---|
| Example 1 | Flank | WC—TiC—Co | AlTiN | 10 | TiN | 10 | $Al_2O_3$ | 3 | 0.05 | 0.65 | ≧100 | 195 |
| | face | WC—TiC—Co | AlTiN | 5 | TiN | 5 | $Al_2O_3$ | 2 | 0.04 | 0.57 | ≧100 | |
| Comparative | Flank | WC—TiC—Co | TiCN | 10 | $Al_2O_3$ | 10 | TiN | 8 | 0.07 | 0.82 | ≧80 | 58 |
| Example 1 | face | WC—TiC—Co | TiCN | 8 | $Al_2O_3$ | 8 | TiN | 10 | 0.09 | 0.78 | ≧80 | |

As shown in Table 1, since the adhesion force was kept low in comparative example 1, the tool life number stayed as low as 58 pieces. On the other hand, in example 1, the adhesion force improved, the tool life number remarkably enhanced to 195 pieces.

Next, in order to confirm the effect of lapping treatment of the cutting tool substrate by Aerolap lapping in the present invention, a chaser for cutting thread was produced, and an experiment was subjected for examining the tool life. In this experiment, first, in the same manner as the above experiment, after mixing and granulating metal powder for the cutting tool substrate, this mixture was pressure-molded in a mold punched out, and the resulting molded compact was sintered in a vacuum at 1450° C. for 1.0 hour, thereby producing a cutting tool substrate. This substrate was used to form a tool (example 2 of the present invention) on which coating layers ware formed without subjecting any treatment on and a tool (example 3 of the present invention) on which coating layers ware formed after subjecting lapping treatment by Aerolap lapping.

The lapping treatment by Aerolap lapping was subjected using a polishing material of 0.5 to 2.0 mm in particle diameter formed by compounding a diamond abrasive grain of 3000 meshes with a polymer type resin.

Each cutting tool substrate was placed in a PVD apparatus, which was then filled with nitrogen gas with a mixed sintered body of Al and Ti as a target, and each metal excited by discharge and nitrogen were allowed to react with one another to form a inner layer of AlTiN on the cutting tool substrate. Thereafter, in the PVD apparatus, the Ti target was excited by discharge under a nitrogen atmosphere to form an interlayer of TiN, and further, the Al target was excited by discharge under an oxygen atmosphere to form an outer layer of $Al_2O_3$, thereby producing a chaser for cutting thread.

Each cutting tool thus produced was examined for tool life. The tool life was measured in the following manner that using the chaser for cutting thread produced by the above method, an alloy containing 5% nickel (S13Cr steel) of 139.7 mm outer diameter×11000 mm length was subjected to VAM-TOP outer diameter thread cutting by four cutting machines at a temperature of 800° C. or more and at a cutting speed of 90 m/min, in order to examine the tool life during cutting.

The term tool life means the number of work pieces that were able to be cut without any one of the situations shown in foregoing (1) to (3). On the basis of this evaluation criterion, the average tool life of the four cutting machines and a standard deviation were obtained.

In example 2 of the present invention, where Aerolap lapping was not subjected, the average tool life was 60.8 and the standard deviation was 18.5, whereas in example 3 of the present invention, where Aerolap lapping was subjected, the average tool life was 77.0 and the standard deviation was 2.5. From these results, it has been found that a longer tool life is stably obtained when Aerolap lapping is subjected.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

According to the present invention, Al in the inner layer dissociates during cutting and diffuses outwardly to form $Al_2O_3$ in the vicinity of the surface of the coating layers to compensate for the outer layer. Therefore, excellent heat resistance and wear resistance can be stably obtained, which can provide a cutting tool with a long tool life. Further, according to a preferred embodiment of the present invention that subjects Aerolap lapping, the adhesion between the cutting tool substrate and the coating layers improves, and so a cutting tool with a longer tool life can be provided. This cutting tool is useful particularly as a chaser for cutting thread used in severe cutting conditions such as thread cutting of hard steel materials.

DESCRIPTION OF REFERENCE NUMERALS

Figure 1:
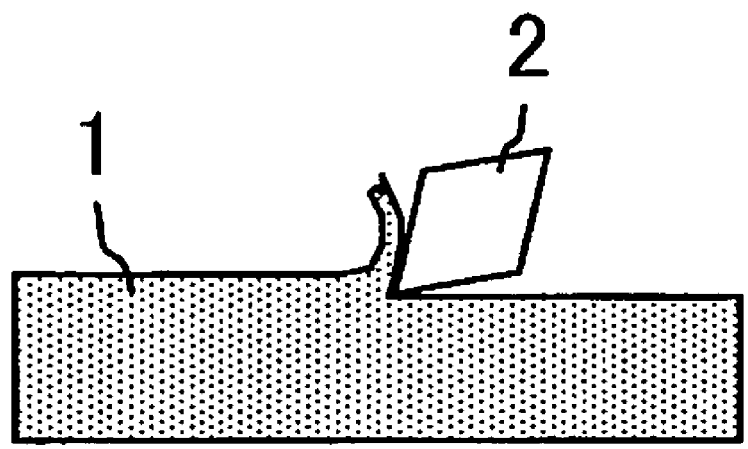
FIG. 1 Schematic diagram showing an example of a cutting tool according to the present invention.
Figure 1:
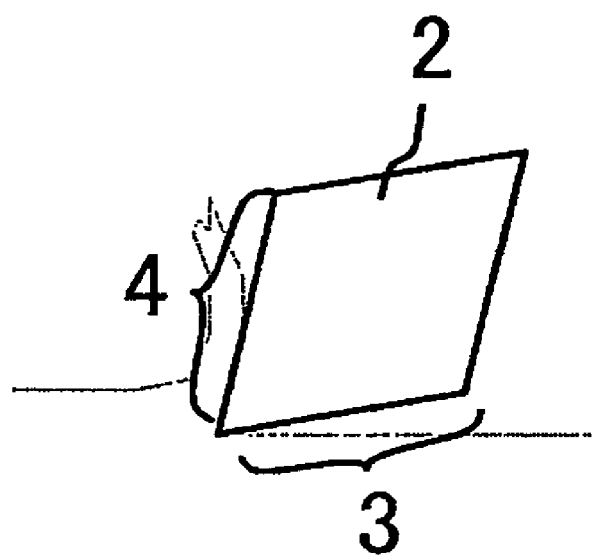

1. Work piece
2. Cutting tool
3. Flank
4. Face

The invention claimed is:

1. A cutting tool having coating layers which are formed on the cutting tool substrate made of hard material, and the coating layers are composed of an inner layer of AlTiN, an interlayer of TiN, and an outer layer of $Al_2O_3$.

2. The cutting tool according to claim 1, wherein the cutting tool substrate is subjected to surface-cleaning and surface treating by projection of flexible abrasives before formation of the coating layers.

3. The cutting tool according to claim 2, wherein the total thickness of the coating layers on a flank is in the range of 2 to 80 μm.

4. The cutting tool according to claim 2, wherein the total thickness of the coating layers on a face is in the range of 2 to 40 μm.

5. The cutting tool according to claim 1, wherein the total thickness of the coating layers on a flank is in the range of 2 to 80 μm.

6. The cutting tool according to claim 5, wherein thicknesses of the inner layer, the interlayer, and the outer layer on the flank are 0.5 to 35 μm, 1.0 to 40 μm, and 0.5 to 5 μm, respectively.

7. The cutting tool according to claim 6, wherein the total thickness of the coating layers on a face is in the range of 2 to 40 μm.

8. The cutting tool according to claim 5, wherein the total thickness of the coating layers on a face is in the range of 2 to 40 μm.

9. The cutting tool according to claim 1, wherein the total thickness of the coating layers on a face is in the range of 2 to 40 μm.

10. The cutting tool according to claim 9, wherein thicknesses of the inner layer, the interlayer, and the outer layer on the face are 1 to 20 μm, 1 to 20 μm, and 0.01 to 2 μm, respectively.

11. A method for producing a cutting tool, wherein coating layers are formed on the surface of the cutting tool substrate made of hard material by a physical vapor deposition or chemical vapor deposition after subjecting surface-cleaning and surface-treating by projection of flexible abrasives.

* * * * *